United States Patent
Heger et al.

[11] Patent Number: 6,100,839
[45] Date of Patent: Aug. 8, 2000

[54] ENHANCED IMPULSE RADAR SYSTEM

[75] Inventors: Charles E. Heger, Saratoga, Calif.;
William M. Sunlin, 6649 Hanover Dr., San Jose, Calif. 95129

[73] Assignees: Zircon Corporation, Campbell; William M. Sunlin, San Jose, both of Calif.

[21] Appl. No.: 09/239,616

[22] Filed: Jan. 29, 1999

Related U.S. Application Data

[63] Continuation-in-part of application No. 08/901,470, Jul. 28, 1997, Pat. No. 5,900,833, which is a continuation of application No. 08/839,663, Apr. 15, 1997, abandoned
[60] Provisional application No. 60/015,548, Apr. 16, 1996.

[51] Int. Cl.[7] .................................................... G01S 13/00
[52] U.S. Cl. ............................................................. 342/22
[58] Field of Search .............................. 342/22, 21, 27, 342/118, 135, 195

[56] References Cited

U.S. PATENT DOCUMENTS

| | | | |
|---|---|---|---|
| 4,430,653 | 2/1984 | Coon et al. | 342/22 |
| 4,675,677 | 6/1987 | von Maydell et al. | 342/25 |
| 4,710,772 | 12/1987 | Cantwell et al. | 342/92 |
| 4,804,963 | 2/1989 | Clapham | 342/195 |
| 4,817,434 | 4/1989 | Anderson | 73/625 |
| 4,937,580 | 6/1990 | Wills | 342/22 |
| 4,965,582 | 10/1990 | Hellsten | 342/25 |
| 5,027,658 | 7/1991 | Anderson | 73/625 |
| 5,077,562 | 12/1991 | Chang et al. | 342/368 |
| 5,134,884 | 8/1992 | Anderson | 73/625 |
| 5,235,857 | 8/1993 | Anderson | 73/625 |
| 5,248,975 | 9/1993 | Schutz | 342/21 |
| 5,294,933 | 3/1994 | Lee et al. | 342/159 |
| 5,334,980 | 8/1994 | Decker | 342/25 |
| 5,339,080 | 8/1994 | Steinway et al. | 342/22 |
| 5,357,253 | 10/1994 | Van Etten et al. | 342/22 |
| 5,381,151 | 1/1995 | Boles et al. | 342/21 |
| 5,394,151 | 2/1995 | Knaell et al. | 342/25 |
| 5,446,461 | 8/1995 | Frazier | 342/22 |
| 5,469,167 | 11/1995 | Polge et al. | 342/25 |
| 5,502,444 | 3/1996 | Kohlberg | 342/22 |
| 5,568,150 | 10/1996 | Taylor, Jr. et al. | 342/189 |
| 5,601,083 | 2/1997 | Anderson | 128/660.07 |
| 5,648,787 | 7/1997 | Ogot et al. | 343/826 |
| 5,673,050 | 9/1997 | Moussally et al. | 342/22 |
| 5,835,053 | 11/1998 | Davis | 342/22 |
| 5,835,054 | 11/1998 | Warhus et al. | 342/22 |
| 5,900,833 | 5/1999 | Sunlin et al. | 342/22 |
| 5,905,455 | 5/1999 | Heger et al. | 342/22 |
| 6,002,357 | 12/1999 | Redfern et al. | 342/22 |

FOREIGN PATENT DOCUMENTS

| | | |
|---|---|---|
| 565047 A1 | 10/1993 | European Pat. Off. . |
| 147829 A2 | 7/1985 | Japan . |
| 493598 B1 | 7/1992 | Japan . |
| WO95/21387 | 8/1995 | WIPO . |

*Primary Examiner*—John B. Sotomayor
*Attorney, Agent, or Firm*—Skjerven, Morrill, MacPherson, Franklin & Friel LLP; Norman R. Klivans

[57] ABSTRACT

An impulse radar system useful, for instance, for ground penetration provides three dimensional images of targets. The radar system includes an antenna array with an arrangement of elements that is irregular so that the spacing between elements is different, thereby minimizing redundancy of path geometry between the array elements and the target. This feature reduces unwanted array sidelobes. The radar system incorporates circuitry which permits the utilization of each array element as either a transmitter or receiver antenna element. This dual utilization increases the effective number of elements in the antenna array, providing increased gain and system resolution. The radar system receiver utilizes multiple antenna array receiver elements, each of which is connected sequentially, through a solid state switch, to a single analog to digital converter, thereby providing a digitized signal for processing and display. This arrangement requires only a single analog to digital converter, thereby reducing size, cost, and errors due to analog to digital converter non-linearities.

8 Claims, 3 Drawing Sheets

ENHANCED IMPULSE RADAR SYSTEM

CROSS-REFERENCE TO RELATED APPLICATIONS

This Application is a continuation in part of U.S. patent application Ser. No. 08/901,470 filed Jul. 28, 1997, now U.S. Pat. No. 5,900,833, which is a continuation of Ser. No. 08/839,663 filed Apr. 15, 1997 now abandoned, which claims priority to Provisional Application Ser. No. 60/015,548, filed Apr. 16, 1996.

FIELD OF THE INVENTION

This invention relates to a method and apparatus for locating objects (targets) e.g. within structures within other materials, or under the surface of the ground, utilizing impulse radar.

BACKGROUND

The above mentioned U.S. patent application Ser. No. 08/839,663 "Material Penetrating Imaging Radar", incorporated herein by reference in its entirety, discloses a system using impulse radar and an array of transmitting and receiving antennas. The signal return from each transmitting antenna is sampled and digitized at each receiving antenna. The return signal is stored in a memory, and also can be stored in a data storage recorder for later processing.

A set of three dimensional pixels defines the search volume. For real time processing, the path delay from each transmitting antenna to each pixel and back to each receiving antenna is calculated. The contents of the memory elements corresponding to these delays are summed. This summation (integration) across the antennas is equivalent to real array beam processing.

The antenna array moves across and above the surface of e.g. the ground (or other volume to be searched). The signal returns relating to each pixel are also summed as the array moves across the ground. This approach provides synthetic aperture beams, which lends itself to parallel processing, which simplifies digital processor requirements.

In one disclosed application the transmitting and receiving antennas are arranged in a linear array which permits simple installation across the line of motion and is suitable for portable, mobile or airborne systems.

SUMMARY

The system disclosed in application Ser. No. 08/839,663 has been found to be subject to various improvements. One improvement is the arrangement of the transmitters and receivers, which reduces image distortion due to analog to digital conversion non-linearities. Another improvement is in the circuitry of the receiving portion of the system. Yet another improvement is circuitry enabling a single antenna to both transmit and receive.

One improvement is in the arrangement of the transmitters and receivers. In the above-referenced application, the transmitter/receiver antennas are shown arranged in a regularly spaced linear array. It has been found that performance improves if the distance between any two transmitter/receiver elements is unequal to a distance between any other two transmitter/receiver elements. This sort of uneven spacing arrangement, whether in a line or in a two or three dimensional array, has been found to be advantageous in providing a greater number of unique multiple receiver/transmit paths. For purposes of the present near range radar this is especially useful in providing more information with relatively few antenna elements.

In the above-referenced application each antenna element is disclosed as having its own sampler and its own dedicated analog to digital converter. A second improvement herein is that in some applications it is advantageous to provide a single analog to digital converter shared by the receiver elements. This analog to digital converter is connected by a multiplexer to the various sampler receiver elements and is thereby switched from antenna to antenna. This economizes on circuitry and power consumption.

A third improvement incorporates switching to permit use of each antenna for transmitting or receiving. For example, if two antennas are used for transmitters and three as receivers, there will be six independent paths. If they can be switched, the number of independent paths increases to ten. This increases the array gain and resolution using the same number of antennas.

DETAILED DESCRIPTION

Impulse radar is well known; see e.g. U.S. Pat. Nos. 5,361,070; 5,589,838; 5,523,760; and 5,517,198 all to McEwan, and U.S. Pat. No. 4,743,906 to Fullerton, all incorporated herein by reference in their entirety. Impulse radar (also known as ultra-wideband radar) utilizes different pulses of energy rather than the more conventional CW (continuous wave) radar. The impulse energy have very broad band frequency spectral content.

In accordance with this invention, as described above, an improvement is made in the impulse radar receiver operation and corresponding receiver circuit. FIG. 5 of the above referenced application shows an impulse radar system with a plurality of impulse generators driving the transmitter antennas and amplifiers coupled to the receiver antennas. Each receiver antenna amplifier drives its own (dedicated) analog to digital converter which in turn provides a digital signal to a signal processor which in turn drives a display. Hence there is one analog to digital converter for each receiver antenna and its associated sampler and amplifier.

Figure 1:
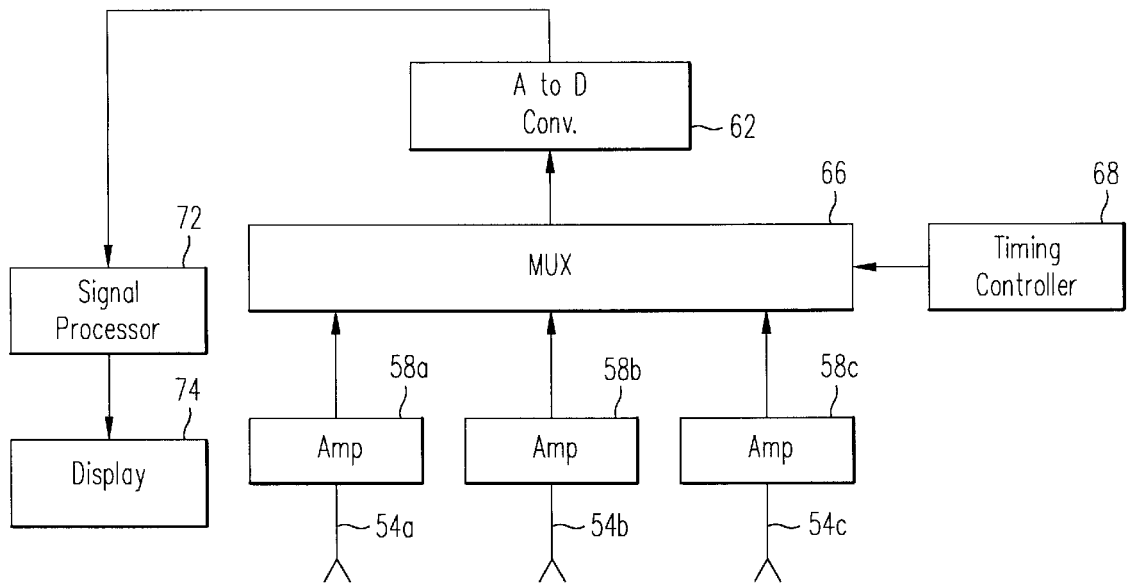
FIG. 1 shows use of a single analog to digital converter connected by a multiplexer to a plurality of receiver samplers.

Present FIG. 1 depicts an improvement over this. (Note that FIG. 1 only shows the receiver portion of the system and not the transmitter.) In FIG. 1, instead of there being one analog to digital converter for each antenna/sampler/buffer, a single analog to digital converter is shared therebetween. All analog to digital converters (ADCs) possess some errors in linearity when converting from an analog to digital signal. When a single ADC is utilized for all channels as is the case here, it is possible to compensate for these errors through a single, e.g, software compensation, rather than one for each channel.

FIG. 1 shows three receiver antennas 54a, 54b, 54c, each in turn driving an associated amplifier/sampler/buffer ("amp") 58a, 58b and 58c. Rather than each antenna/sampler/buffer having its own analog to digital converter, all three of these antenna/sampler/buffers share a single analog to digital converter 62, and a conventional multiplexer 66 allows switching therebetween. A conventional timing controller 68 controls the multiplexer 36 to determine which of the three input channels 58a, 58b and 58c are to be connected into the analog to digital converter 62 at any one time. For instance, this is a simple sequential switching amongst the three receiver channels. The frequency of the multiplexer switching is application dependent.

The analog to digital converter 62 supplies the digitized signals to signal processor 72 which in turn drives a display 74, as described in the above-referenced application.

The FIG. 1 apparatus advantageously requires less circuitry (in terms of analog to digital converters) than does a system having a dedicated analog to digital converter for each receiver channel. This is especially advantageous where there are a large number of receiver channels.

Figure 2:
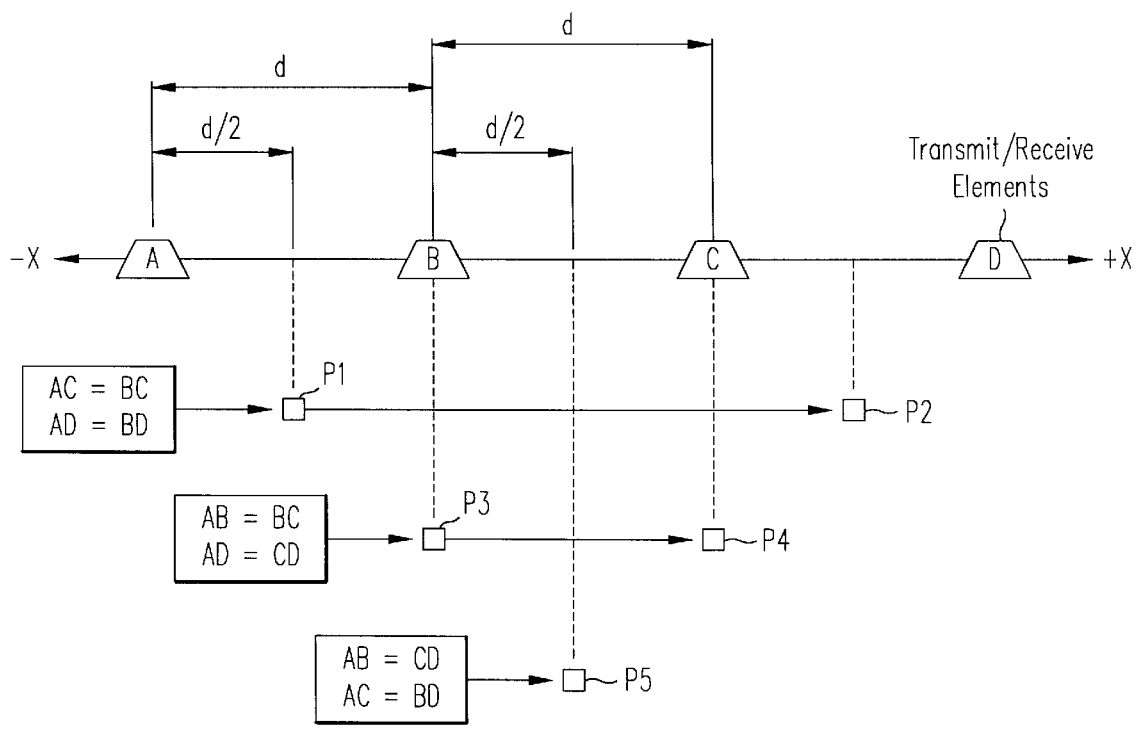
FIG. 2 shows a prior art linear arrangement of antenna transmitter/receivers.

Regarding another aspect in accordance with this invention, FIG. 2 shows an impulse radar system having four transmitter/receiver antennas A, B, C and D. Each of these antennas can be either a transmitter or receiver element. In one embodiment, each antenna is a flared rectangular horn housing the active transmit/receive antenna element. In one version there is a piece of dielectric foam in front of the antenna element, and a piece of radar absorbing material (RAM) behind the antenna element. The foam and RAM each fill the height and width of the horn. Such materials are commercially available and have been found to improve performance of the antenna by reducing reflection, which may reduce secondary temporal response. These materials help match the impedance of the antenna to that of the target.

In the above-referenced application, the transmitter/receiver antennas are shown evenly spaced in a line so they are each separated by distance d. Using this configuration, when all possible paths from each transmitter to each pixel and then to each receiver are considered for each transmitter/receiver pair to all possible pixels in the target volume, redundancy is present in path length between certain transmitter/receiver pairs. For a four antenna array, for example, any pixel P1, P2, etc. located in a plate perpendicular to the line containing the antennas and passing through the center of the antenna array will have a path length that is the same as shown, where "AC" refers to the signal path from transmitter A to receiver C via pixel P1.

In accordance with this invention, if the spacing of the antennas A, B, C, D is random (irregular) along the line X—X, this redundancy is limited to lines of revolution, and if the spacing is varied two dimensionally, the redundancy is limited to points. This reduction in redundancy in path lengths advantageously improves image reconstruction due to an increased number of unique paths. In addition, this diversity in path lengths minimizes spurious responses due to overshoots in the impulse signal, since path lengths to locations away from the imaged pixel will be diversified.

Figure 3A:
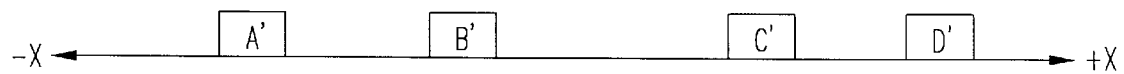
FIGS. 3A, 3B show arrangements of transmitter/receiver antennas in accordance with this invention with irregular spacing therebetween.

A first antenna configuration in accordance with this invention is thus shown in FIG. 3A, with the transmitter/receiver antennas A', B', C', D' spaced irregularly along the line −X to +X.

Figure 3B:
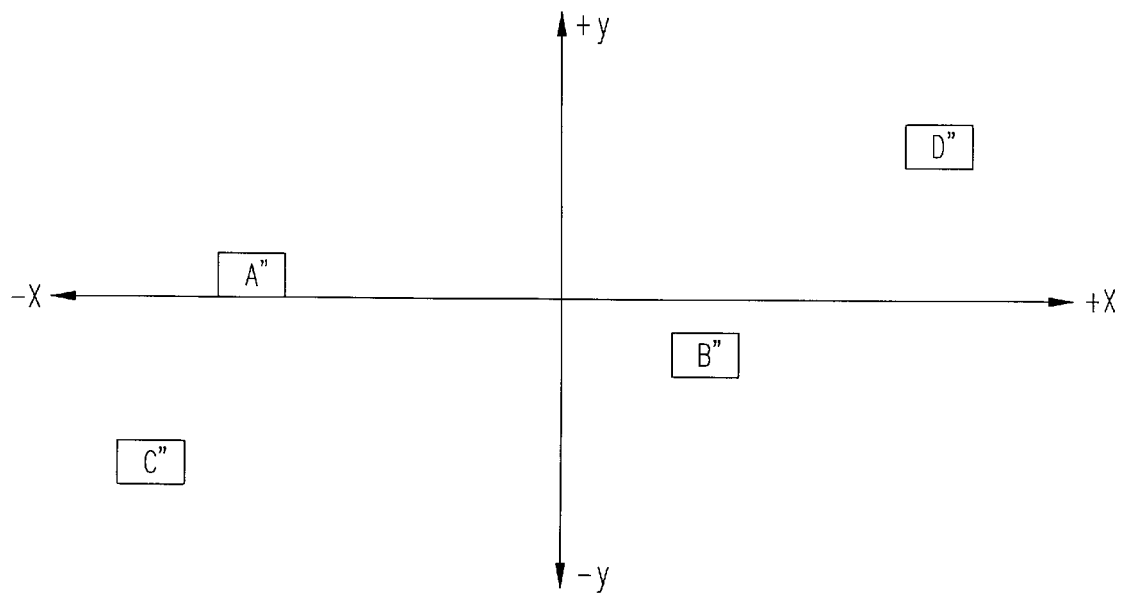

A second antenna configuration in accordance with this invention is shown in FIG. 3B. Here the transmitter/receiver antennas A", B", C", D" are configured so that they are not all in a line but are spaced in the X-Y plane and moreover, their spacing is irregular. (The transmitter/receiver antennas do not each need to be both a transmitter and receiver but may be one or the other.)

Hence duplicate path lengths are minimized, so there is a maximum number of path lengths per pixel with respect to a target and each pixel in the target has a probability of having a different path length, therefore providing better resolution. If the transmitter/receiver antenna elements are each located in a (two-dimensional) plane as depicted in FIG. 3B, optimally the distance between any two transmitter/receiver antennas in that plane is unequal to that of any other element spacing.

Also, of course, the antennas do not need to be in a single plane but alternatively are dispersed three dimensionally (3-D, not shown). The 3-D arrangement adds additional diversity to the paths over the 2-D (X-Y plane) arrangement. Thus there is provided an efficient utilization of the transmitter/receiver antennas with regard to the available paths for target definition.

Figure 4:
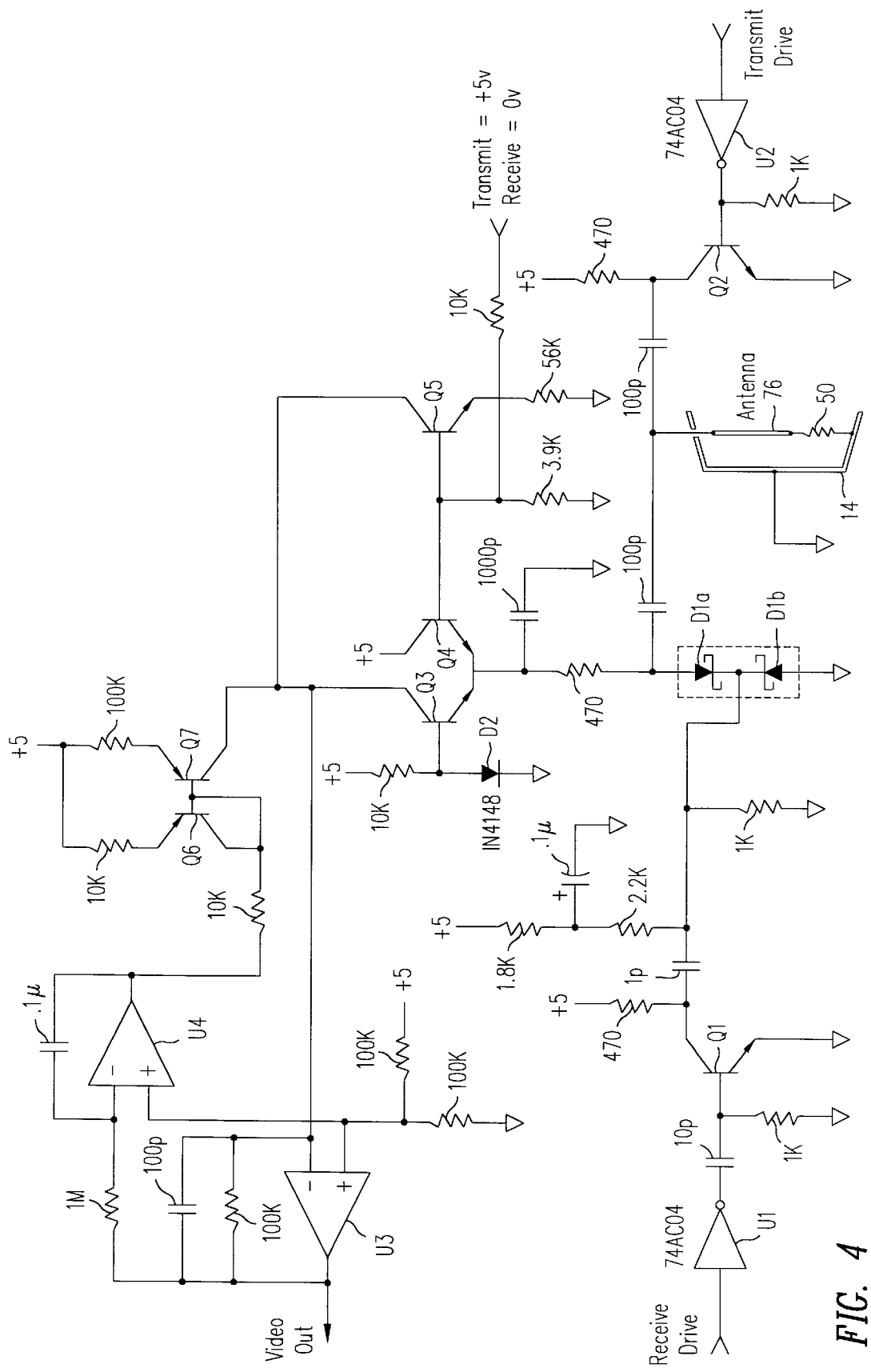
FIG. 4 shows a schematic diagram of transmit/receive circuitry for a shared antenna.

The schematic diagram of FIG. 4 (including parts values and in some cases parts numbers) depicts one embodiment of circuitry associated with each transmitter/receiver antenna element, for switching the associated sampler between transmitting and receiving, as described above. (Note that the above-referenced patent to Fullerton discloses a dual use antenna.)

The transmitter and receiver pulse drivers are identical. The transmitter circuit includes driver U2 and transistor Q2 driving the antenna and the receiver circuit has driver U1 and transistor Q1 driving the receiver sampler, which in turn are connected to antenna element 76. Q1 and Q2 are fast switching transistors with a fall time of about 100 picoseconds, with the base of each transistor capacitively coupled from their respective drivers U1 and U2.

The antenna element 76 is capacitively coupled to both the transmitter transistor Q2 and the receiver sampler diodes D1a,D1b. The sampler D1a,D1b is DC biased such that the transmit pulses appearing at antenna 76, although capacitively coupled through to the receive sampler, do not exceed the reverse breakdown voltage of diode D1a, with the transmit pulse being isolated from the receive circuit following the sampler by the 470 ohm resistor coupled between diode D1a and transistors Q3, Q4. The same isolation technique is also used when the transmit signal is idle with transistor Q2 off and the sample drive pulse from transistor Q1 loaded only by the 470 ohm resistor on transistor Q2's collector in addition to driving the sampler diodes D1a,D1b.

The output of the sampler D1a,D1b is applied to the common base amplifier transistor Q3 through the 470 ohm resistor and the 1000 picofarad capacitor connected to both transistors Q3 and Q4's emitters and to ground and which serve as the integrating element for the sampled received energy.

Transistor Q3, configured as a common base amplifier, routes the integrated sampler current to transistor U3 for further amplification while allowing transistor Q3's collector to be voltage varied for biasing purposes.

Transistors Q6 and Q7 are a current mirror to inject a DC current into transistor Q3's collector, which exactly cancels the average static sampler current while allowing the AC signal current from the sampler to be amplified. The feed back coupled integrator (amplifier) U4 provides negative feedback to accomplish this with its output controlling the master current mirror, transistor Q6.

While receiver transistor Q3 is on, transistors Q4 and Q5 are off, with the action previously described. When transmitting, transistor Q3 is biased off and transistors Q4 and Q5 are turned on via the receive/transmit control line (0V, +5V). The sampler energy now associated with the transmit pulse is vented through transistor Q4 and not allowed to reach the amplifier U3.

Additionally, with transistor Q5 on, its collector current is adjusted by means of the 56K ohm resistor coupled to its emitter to provide a current that is exactly equal to the average static sampler current when receiving. This keeps the feed back integrator U4 from charging during transmit periods and allows for rapid switching from transmitting to receiving by needing only a minimal recovery time for the receive sampler amplifier path. This technique then allows rapid channel switching for maximum system throughput.

The output signal of amplifier U3 then is coupled to a multiplexer (not shown) whose output signal drives a common path system A/D converter as described in the above-referenced application.

This disclosure is illustrative but not limiting; further modifications will be apparent to one skilled in the art in light of this disclosure and are intended to fall within the scope of the appended claims.

We claim:

1. An impulse radar system comprising:

a plurality of receiver/transmitter antennas; and a signal processor coupled to receive signals received by the antennas;

wherein a path length of a signal from a first of the antennas reflected by a target to a second of the antennas is different from a path length of a signal from the first of the antennas reflected by a target to any other of the antennas.

2. The system of claim 1, wherein the antennas are disposed in a single line.

3. The system of claim 1, wherein the antennas are disposed in two dimensions.

4. The system of claim 1, wherein the antennas are disposed in three dimensions.

5. A method of operating an impulse radar, comprising the acts of:

providing a plurality of receiver/transmitter antennas, each receiving or transmitting impulse radar pulses;

locating the antennas so that a path length of a signal from a first of the antennas reflected by a target to a second of the antennas is different from a path length of a signal from the first of the antennas reflected by a target to any other of the antennas; and processing signals received by the antennas to determine a location of an object reflecting the transmitted pulses.

6. The method of claim 5, wherein the acting of locating comprises the act of locating the antennas in one of single line, two dimensions, or three dimensions.

7. An impulse radar system comprising:

a single antenna element adapted to transmit and receive ultrawideband impulses;

a transmitter pulse generator coupled to the antenna element at a node;

a sampler coupled to the node;

a receiver circuit coupled to receive an output signal from the sampler;

a first resistor coupled between the node and the receiver circuit; and a second resistor coupled to the node and to the pulse generator, whereby the first and second resistors isolate the pulse generator from the receiver circuit.

8. The system of claim 7, wherein the transmitter pulse generator and the sampler are each capacitively coupled to the node.

* * * * *